United States Patent [19]

Porel

[11] 4,449,552

[45] May 22, 1984

[54] PRESTRESSED ASSEMBLED OLEO-PNEUMATIC ACCUMULATORS

[75] Inventor: Louis C. Porel, Rambervillers, France

[73] Assignee: Hydro Rene Leduc, Baccarat, France

[21] Appl. No.: 457,702

[22] Filed: Feb. 11, 1982

[30] Foreign Application Priority Data

Feb. 27, 1981 [FR] France ................................ 81 03926
May 8, 1981 [FR] France ................................ 81 09206

[51] Int. Cl.³ ................................................ F16L 55/04
[52] U.S. Cl. ......................................................... 138/30
[58] Field of Search .......................... 138/30; 220/85 B

[56] References Cited

U.S. PATENT DOCUMENTS 2,919,718 1/1960 Mercier ................................ 138/30
2,947,326 8/1960 Mercier ................................ 138/30
3,140,729 7/1964 Mercier ................................ 138/30

*Primary Examiner*—John W. Shepperd
*Attorney, Agent, or Firm*—Darby & Darby

[57] ABSTRACT

An oleopneumatic accumulator having a first chamber receiving hydraulic fluid and a second chamber receiving pressurized gas with the chamber being separated by a flexible diaphragm is disclosed. The accumulator has a cylindrical shell with two open ends closed by plugs. The plugs are held together by at least one pretensioned tie rod and one end has a larger inner diameter than the other end. When a predetermined pressure is exceeded the larger inner diameter cylinder end will separate from its plug reducing hydraulic pressure to a value less than the predetermined pressure.

15 Claims, 9 Drawing Figures

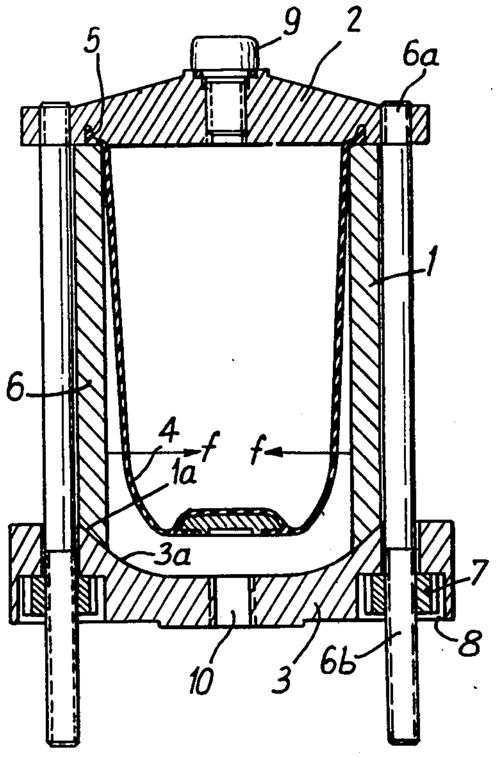
Fig:1
Fig:2
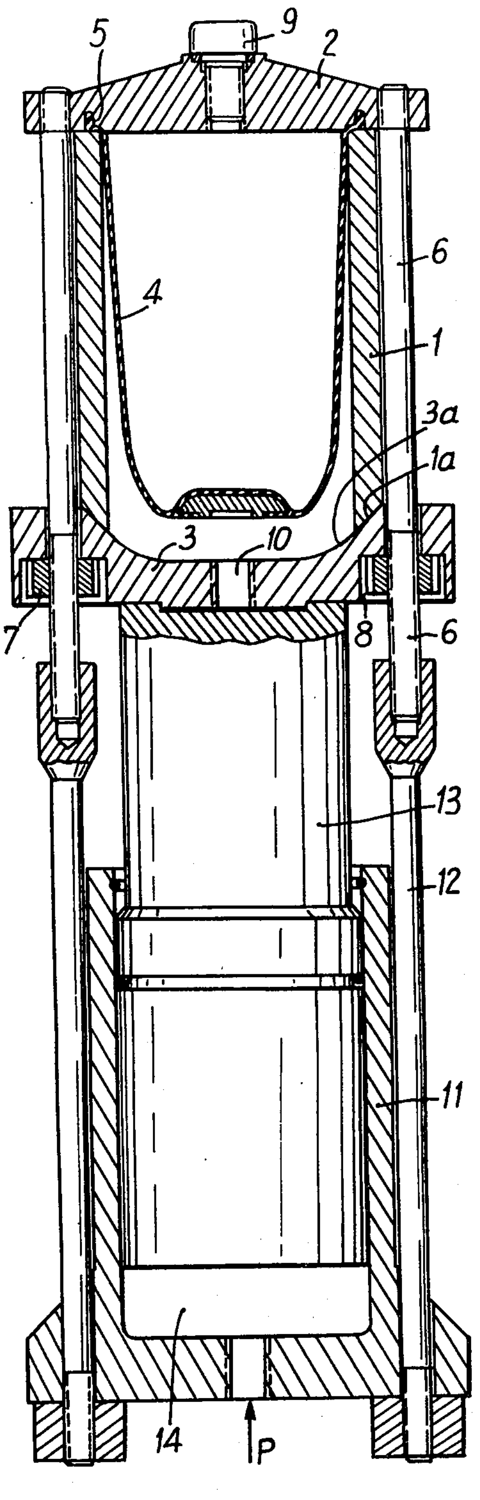

PRESTRESSED ASSEMBLED OLEO-PNEUMATIC ACCUMULATORS

FIELD OF THE INVENTION

The present invention is directed to improvements in oleo-pneumatic accumulators of the type comprising two enclosures separated by a deformable wall, in rubber, one of said enclosures being filled with gas under pressure and the other receiving a hydraulic liquid under pressure; the parts forming said accumulator being maintained assembled by a prestress device.

BACKGROUND OF THE INVENTION

In French patent application Ser. No. 80 04313 dated Feb. 27, 1981 and its Addition Ser. No. 80.09781 dated Apr. 30, 1980, is disclosed an oleo-pneumatic accumulator made of two substantially semispherical shells, assembled to each other with interposition of a flexible membrane and a cylindrical spacer wedge, the two shells and the wedge being maintained pressed against each other by an outer belt subjected, before assembly, to a previous prestress generating a clamping effort superior to the maximum separation effort of said parts when the accumulator thus formed is subjected to the maximum utilization pressure.

On the other hand, it is known from French patent application Ser. No. 81.00740 filed on Jan. 16, 1981 by the same applicant how to manufacture a hydraulic accumulator by means of a tubular central body sealed at both ends by a plug.

The prestressed accumulators according to French patent application Ser. No. 80.04319 and its Addition Ser. No. 80.09781 provide excellent results, but offer various disadvantages. First of all, their mass production is difficult since it requires a rather complex mechanism which is time consuming when used for setting the cylindrical belt surrounding the parts under a preliminary stress. After, it appears that when the effort for providing the preliminary tension is released, a part of the prestress is absorbed by a relative contraction of the wedge and by a deformation, even very slight, of the threadings. The result is a fairly variable value of the prestress remaining after assembly of the parts.

The accumulators disclosed in patent application Ser. No. 81.00740 offer the considerable advantage of being very economical to manufacture, but they have the disadvantage of not resisting the high utilization pressures and therefore of being unusable in hydraulic circuits working at high or very high pressure.

OBJECT AND SUMMARY OF THE INVENTION

The present invention has as an object to combine the advantages of both manufacturing methods described hereabove, thereby obtaining a hydraulic accumulator which is prestressed—and therefore can resist very high pressures—while being much less costly to manufacture than the presently used hydraulic accumulators.

Such a combination offers also further advantages relating to the accuracy and the reliability, which will be explained hereafter.

According to a first embodiment, the present invention relates to an oleo-pneumatic accumulator comprising two enclosures separated by a flexible membrane, one of said enclosures being filled with gas under pressure, the other being connected to a hydraulic circuit, also under pressure, the various parts being maintained pressed onto each other by an assembly means previously set under a determined tension so as to provide a prestress exceeding the separation effort caused by the maximum utilization hydraulic pressure, said accumulator being made of a cylindrical body placed between two plugs which are connected to each other via a plurality of tie-rods, said tie-rods being previously set under tension so as to provide a prestressed tightening.

According to a second embodiment, the two plugs are connected to each other via a single central tie-rod extending through theirs centers.

Preferably, the central cylindrical body is bevelled at at least one of its ends so as to provide on the one hand a self-centering of the parts, and on the other hand the introduction in the assembly of a radial component which, to the longitudinal prestress, superposes a radial prestress.

BRIEF DESCRIPTION OF THE DRAWINGS

The invention will become more apparent from the following description of non limiting examples, in conjunction with the accompanying drawings wherein:

FIG. 1 is a longitudinal sectional view of an oleo-pneumatic accumulator according to the present invention, FIG. 2 is a longitudinal sectional view of the assembly procedure of the accumulator of FIG. 1.

DETAILED DESCRIPTION OF THE EMBODIMENTS

Figure 3:
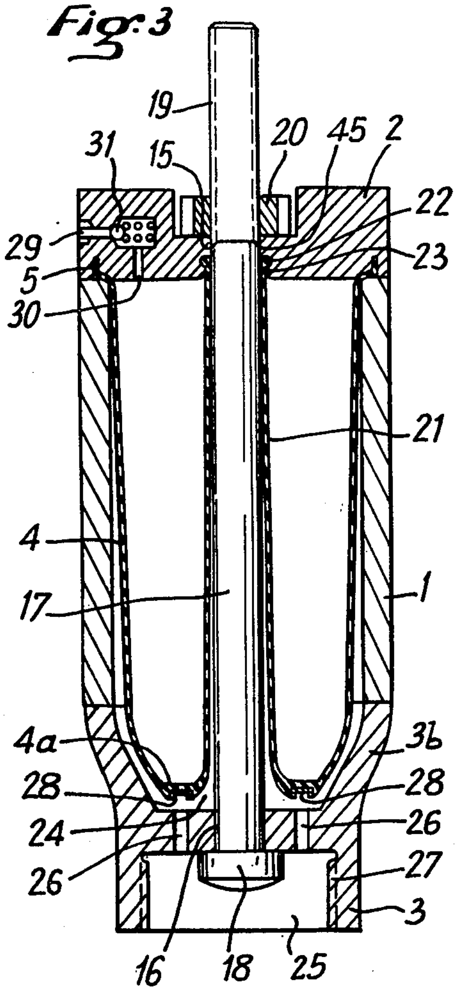
FIG. 3 is a longitudinal sectional view of a second embodiment of the accumulator according to the present invention.

Reference being made to said figures, one sees that the accumulator is made of a tubular body 1 sealed at both ends by plugs 2 and 3, the flexible membrane 4 being anchored by being clamped over its periphery 5, provided with a bead, between the upper edge of the cylindrical body 1 and the lower face of plug 2. In the case of FIGS. 1 and 2, the two plugs 2 and 3 have a diameter superior to that of the cylindrical body 1 and are connected to each other via a plurality of tie-rods 6 so that body 1 is compressed by the traction exerted by said tie-rods.

Preferably and as is shown in FIGS. 1 and 2, said tie-rods 6 are made of threaded rods, one end *6a* of which being screwed into the threading provided in the mass of plug 2, the other end *6b* of which being provided with a threading on which is engaged a nut 7 bearing against the inner wall of plug 3. As is shown, the nuts 7 can fit into housings 8 formed in the wall of plug 3.

Also preferably, one of the ends of the central body has a conical surface *1a* coming to bear against a conical surface of same inclination *3a* provided in the inner wall of the corresponding plug.

As is known, plug 2 is provided with a gas filling valve 9 and plug 3 with a duct 10 to be connected to a hydraulic circuit.

According to the present invention, the prestress is accomplished by means of a hydraulic jack, the body 11 of which is connected by means of tie-rods 12 to the tie-rods previously described; the piston 13 of the jack bears against the outer face of plug 3; while the jack body exerts a traction on plug 2 by means of tie-rods 12 and 6.

Preferably and as is shown, the inner boring of jack 11 is rigorously equal to the inner boring of central body 1.

The hydraulic pressure is introduced into chamber 14 of the jack and, when the desired prestress pressure "p" is reached, the nuts 7 are screwed until they come in contact with the outer wall of plug 3 and the hydraulic pressure is released.

When, in service, the pressure of the hydraulic liquid reaches the prestress pressure value "p" and exceeds it slightly, surfaces 1*a* and 3*a* slightly move away from each other and the hydraulic liquid can leak outside the accumulator as through an over-pressure valve. The value of the maximum pressure at which the accumulator starts leaking corresponds in practice exactly to the pressure "p" used for establishing the prestress, thereby allowing determining with a great accuracy the accumulator characteristics.

On the other hand, since the various mechanical parts are subjected to the prestress effort before said effort is released, there is not, as is the case with the accumulator disclosed in French patent application Ser. No. 80.04313 a reduction of the prestress value, by contractions and resilient deformations of the parts since such deformations take place before the prestress pressure "p" is released.

Moreover, the fact that surface 1*a* of the end of body 1 is conical and bears against the surface 3*a* which is also conical provides at the same time an excellent tightness, the self-centering of the parts and brings about a radial component of the prestress effort which, in FIG. 1, is illustrated by the arrows f converging towards the center.

FIGS. 3 through 9 show a second embodiment of the invention consisting in replacing the tie-rods 6 placed about tube 1 outside said tube by a single tie-rod extending axially through the two plugs 2 and 3, the cylindrical body and the membrane 4.

It is known per se, particularly from French Pat. Nos. 1 150 762 and 1 378 955 how to assemble the various parts of a hydraulic accumulator via a central rod extending axially through the various constituents of the accumulator, including the deformable membrane. But such patents do not disclose the essential arrangement according which an assembly is provided under a prestress, which is determined in a very accurate manner as a function of the maximum utilization pressure of the accumulator, so that the hydraulic liquid starts automatically to leak as soon as said maximum utilization value is reached.

As can be seen in FIGS. 3 through 9, the accumulator is made of a hollow cylindrical central body 1, enclosed between two upper and lower plugs 2 and 3. The upper plug 2 is maintained flatwise on the upper end of the cylindrical body 1; while the lower plug 3 includes a skirt 3*b* which is connected to the lower end of said cylindrical body 1. The upper plug 2 is formed with an opening 15, provided in its center and the lower plug 3 with an opening 16, also provided in its center.

The three parts 1, 2 and 3 forming the accumulator are assembled via a central tie-rod 17. Said tie-rod 17 comprises a head 18 bearing against the outer wall of plug 3 and a threaded end 19 on which is screwed a nut 20 bearing against the outer wall of plug 2.

In the example shown in FIG. 3, membrane 4 is anchored by having its bead 5, provided about its periphery, squeezed between plug 2 and the upper end of the central cylindrical body. But the membrane comprises also a sort of central part or sleeve 21 forming a hollow tube into which fits the tie-rod 17. The upper edge of sleeve 21 comprises a flange 22 which fits into a groove 23 of corresponding shape provided in the wall of the central opening 15 of plug 2.

The membrane base 4*a* has an annular shape matching substantially the shape of the annular space 24 formed by the inner wall of skirt 3*b* of plug 3 and tie-rod 17. Plug 3 is formed with a boring 25 communicating with space 24 via a plurality of ports 26. The boring 25 is formed with a threading 27 allowing screwing the accumulator on a socket or union (not shown) setting said boring 25 in communication with any appropriate hydraulic circuit (also not shown). Preferably, the lower portion 4*a* of membrane 4 is provided with pellets 28 opposite ports 26.

Plug 2 is provided with a side opening 29 which, by means of an angle duct 30 into which is mounted a non-return valve 31, is in communication with the enclosure which has to be filled with gas under pressure.

Figure 4:
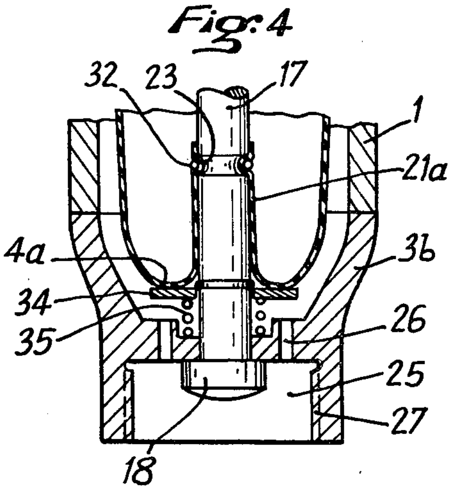
FIGS. 4 and 5 are two views showing alternative embodiments of the separating membrane.
Figure 5:
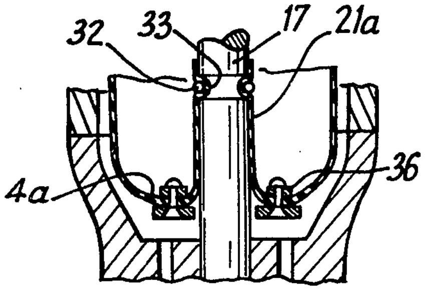

FIGS. 4 and 5 show two alternative embodiments according which the membrane central sleeve does not extend up to the whole height of the accumulator inner volume, but ony over a portion of said height. In said both figures, one sees that the central sleeve 21 of membrane 4 extends up over about only a quarter of the height of the inner volume and is simply fixed by retaining ring 32 locking it inside a groove 33 formed in the tie-rod 17. In order to avoid that membrane 4 be driven through the ports 26 when the accumulator is completely emptied from its hydraulic liquid, it is possible, as is shown in FIG. 4, to have its annular bottom 4*a* resting on a mobile plate formed by a washer 34 maintained by a spring 35, or by providing it with pellets 36, as shown in FIG. 5, said pellets 36 being made of two parts riveted onto each other instead of being incorporated in the rubber mass, as is the case with the pellets 28 of FIG. 3.

The central tie-rod maintains parts 1, 2 and 3 assembled under a prestress, so that when the hydraulic liquid pressure exceeds a predetermined value, the elongation of tie-rod 17 is such that a leakage occurs at the connection between the cylindrical body 1 and plug 2 or plug 3; the result is that the hydraulic pressure cannot, under any circumstance, exceed a predetermined maximum value, which value is a function of the resiliency characteristics of tie-rod 17 and of the prestress to which the parts are subjected.

Figure 6:
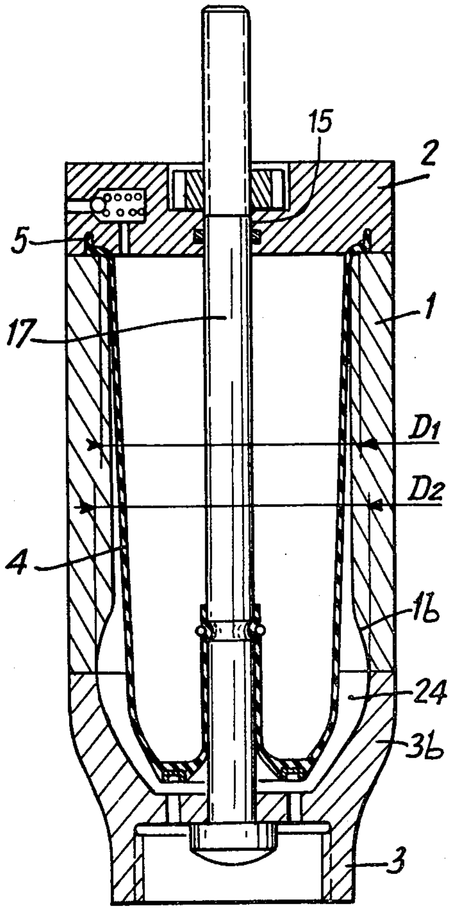
FIG. 6 is a longitudinal sectional view of a first alternative embodiment of the accumulator shown in FIG. 3.

FIG. 6 shows an alternative embodiment of the accumulator described in FIGS. 3 through 5, offering the advantage of improving the operation of said accumulator when there is an overpressure.

It has been found out in fact that if the inner section of the inner cylindrical body 1 is constant, as is the case in FIGS. 3 through 5, the leakage, when there is an overpressure, can occur in the top portion as well as in the lower portion, that is between plug 2 and the top of body 1 as well as between plug 3 and the bottom of body 3. When the leakage occurs between the plug 2 and the top of body 1, the membrane is in danger of being driven away, squeezed between plug 2 and the top of body 1 and being torn, thereby putting the accumulator out of service.

In order to remedy this disadvantage, one provides at the base of body, at the junction between the body and skirt **3*b* of plug 3 a chamfer 1*b*. Preferably, the skirt 3*b* is also machined so that the bearing surfaces of the base of the cylindrical body 1 and of the skirt 3*b* be equal. Section D2 of the base of cylindrical body 1 is then superior to the section D1 which is subjected, at the top of body 1, to the hydraulic pressure prevailing in space 24: the result of this will be that, should there be an overpressure, the leakage will always occur between body 1 and skirt 3*b* and never between body 1 and plug 2**.

Figure 7:
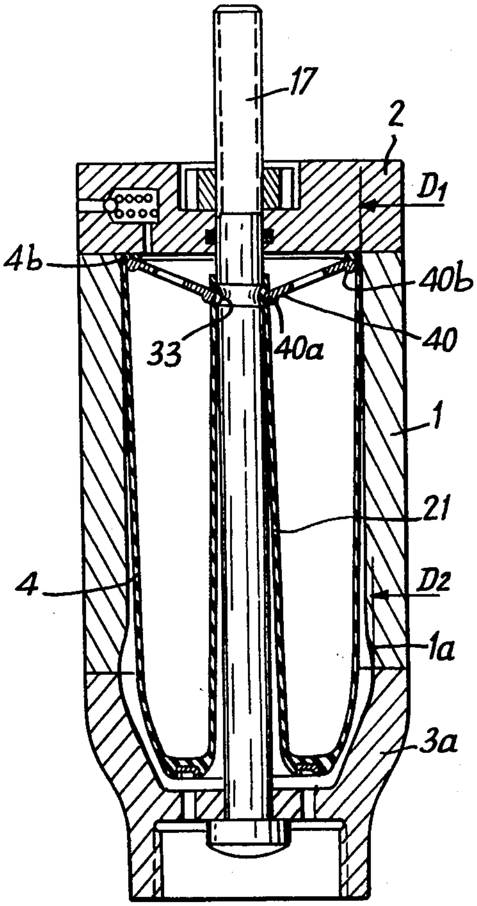
FIG. 7 is a longitudinal sectional view of another alternative embodiment of the separation membrane.

FIG. 7 shows a further alternative embodiment.

The anchoring mode of membrane 4 by means of a bead 5 as shown in FIGS. 3 through 6 has the disadvantage that the surface of section D1 hereabove mentioned is not rigorously determined. Indeed, a larger or lesser tightness of the squeezing can allow the hydraulic liquid to leak between the membrane and the top of body 1, the effect of which will be that the section D1 on which acts the hydraulic pressure will always be slightly superior to the section of the inner boring of cylindrical body 1, but by a quantity which cannot be determined rigorously. It is the reason why, in FIG. 6, section D1 is shown as being larger than the inner diameter of cylindrical body 1, but this indication is only an approximation.

On the other hand, since the leakage, when there is an overpressure, can only occur between skirt **3*a* and the base of body 1**, any risk of extrusion of the fixation part of the membrane is eliminated.

The membrane 4 can therefore be fixed by means of a simple resilient washer 40. Said resilient washer 40 is formed with a central hole through which extends the tie-rod 17 and the upper edge of sleeve 21. At the height of the central hole, the tie-rod 17 is formed with a groove 33; so that the end of sleeve 21 is clamped in said groove 33 by the rounded edge **40*a* of washer 40. The outer edge 4*b* of membrane 4 is squeezed between the corner formed by the junction of cylindrical body 1 and plug 2 by the rounded peripheral edge 40*b* of washer 40. The more the tie-rod 17 is urged in traction, the more the resilient washer 40 will force energetically sleeve 21 inside groove 33 and the membrane edge 4*a*** in the corner.

Such an arrangement is particularly advantageous since it is very economical while being very reliable.

The accumulators shown in FIGS. 3 through 7 are set under a prestress. For so doing (FIG. 8), the end of rod **37*a* of piston 37 of the hydraulic jack 38 which bears against plug 2 via a cylindrical wedge 39 is screwed onto the threaded end 19 of tie-rod 17. With the assistanece of said jack, a compression effort is applied on the one hand on parts 2, 1 and 3, effort which is absorbed by the resiliency of the metal of which are made said parts, and on the other hand a traction effort on tie-rod 17, which effort is also absorbed by the resiliency of the metal of which is made tie-rod 17. When the predetermined maximum effort is reached, the nut 20 is tightened onto plug 2 and the pressure within jack 38 is then released. The resiliency of parts 1, 2 and 3 on the one hand and of tie-rod 17 on the other hand results in the assembly of parts 1, 2 and 3** under a prestress.

EXAMPLE

Figure 8:
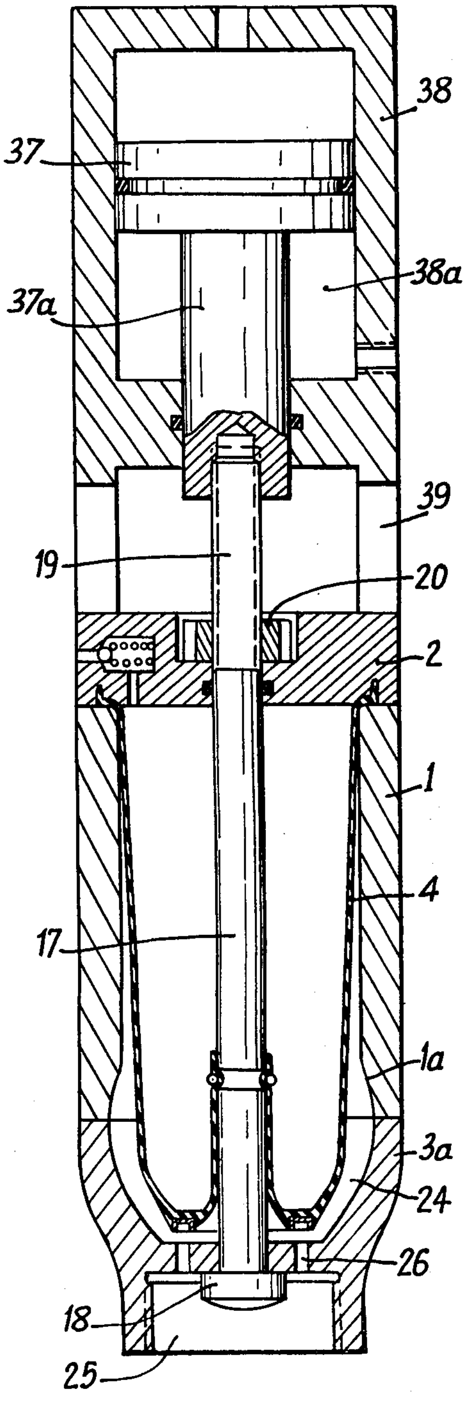
FIG. 8 is a longitudinal sectional view showing how the prestress is applied.

By way of example, an oleo-pneumatic accumulator as shown in FIG. 8 has been provided with a capacity of 1 liter. In chamber **38*a* of jack 38 has been introduced a hydraulic liquid under a pressure of 100 bars. The nut 20 has then been tightened onto threading 19 by using a dynamometric wench so as to have a determined tightening couple; the mouting jack has then been disassembled and the accumulator placed on a test bench and the hydraulic liquid forced at 25, 26, 24, until a leak of the hydraulic liquid occured between the base 1*a* of the cylindrical body 1 and skirt 3*a* of the plug; the pressure P1 for which the leak occured has been noted. The procedure was carried over again by admitting a pressure of 120 bars in chamber 38*a*, tightening nut 20 with the same tightening couple, disassembling jack 38 and admitting again the liquid under pressure at 25, 26, 24 until a leak occured and by taking note of the pressure P2 for which the leak occured. The procedure was repeated by increasing each time the pressure admitted into chamber 38*a* by 20 bars and the pressures P3, P4, . . . Pn** for which the leak occured have been noted, thereby having the possibility of plotting point by point the curve characteristic of the accumulator. These operations were stopped when the value of Pn equaled 400 bars.

The accumulator is then set so as to operate at a maximum pressure of 400 bars.

When an accumulator of usual type is used for operating in a hydraulic circuit at a maximum pressure of N bars, the safety regulations require that it should be tested for 1.5 N.

Therefore, the accumulator was subjected to a pressure of $1.5\times400$ bars, viz. 600 bars, but it started leaking at a pressure of 410 bars, and it has been impossible to exceed this value: the operation safety of such an accumulator is therefore absolute, which is not the case with the accumulators of known type.

On the other hand, when an accumulator of usual type is manufactured, it is subjected to endurance tests at the end of which, after a large number of cycles during which it is subjected to the maximum pressure, it is disassembled for checking the deteriorations suffered.

The accumulator tested was subjected to 5,000,000 of cycles and did not exhibit the slightest trace of deterioration when disassembled, whereas the usual accumulators show traces of deterioration after approximately 150,000 cycles.

The extraordinary ability of the accumulator thus described allows using it not only as an accumulator but also as an overpressure valve.

An over-pressure valve is a known apparatus, extremely simple, made of a valve supported by a calibrated spring: when the hydraulic pressure exceeds a predetermined value, the ball is lifted and the hydraulic liquid flows to the tank.

The well known disadvantage of such devices is that they often cause momentary overpressures up to 1.3 and even 1.5 times the value of the maximum admissible pressure. The reason of this is that it often happens, when there is an abrupt pressure increase, that the valve opens too abruptly, thereby causing a too strong compression of the spring, the calibration of which increases: to that is added an oil lamination effect the effects of which are proportional to the square of the flow rate. Moreover, the effects of oil lamination are such that the metal is dug into by the oil flux.

Such disadvantages are well known to hydraulic engineers, but to this day there are no spring overpressure valves which do not exhibit such disadvantages.

By providing in a by-pass in a hydraulic circuit an accumulator with a predetermined leakage characteristic according to the invention, and by surrounding it with an envelope allowing recovering the leakages and sending them to the tank, there is obtained an overpressure valve which operates perfectly satisfactorily. The capacity of the accumulator is determined experimentaly as a function of the maximum flow rate of the circuit for which it is intended. Such an overpressure valve will be cheaper than a spring valve of greater dimensions, will not be sensitive to dirts existing in the liquid, will have a leakage section such that there will be no more high speed fluid flow eroding the metal, and will operate without causing overpressure.

Figure 9:
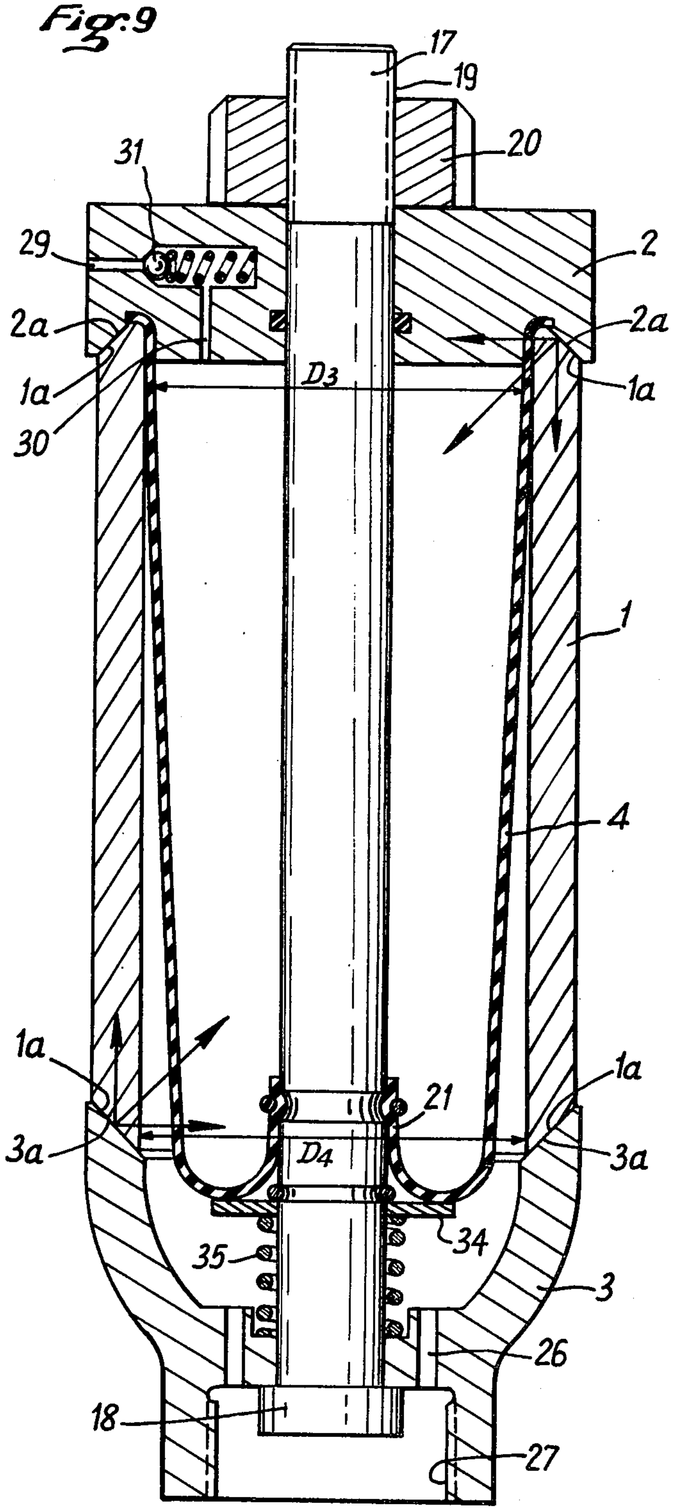
FIG. 9 is a longitudinal sectional view of an alternative embodiment of the accumulator shown in FIGS. 3 or 6.

Preferably, and as is shown in FIG. 9, the two ends of central body 1 are bevelled, as described for the conical surface 1*a* in connection with FIG. 1. Thereby is obtained, as in the case of FIG. 1, but in an improved manner, not only a self-centering of the parts and an excellent tightness, but also a radial component of the prestress effort.

On the other hand, it has been established that by providing the separation membrane 4 in a shape such that it is cylindrical in its top portion, as is shown, and that said cylindrical portion is placed inside the upper portion of the central body 1, which is itself cylindrical, the result is that the diameter $D_3$ of the circle on which acts the pressure on the upper plug 2 is slightly less (due to the thickness of the membrane) than the diameter $D_4$ of the circle according which the pressure acts on the lower plug 3: the result is that when the pressure which is admitted into the accumulator exerts on the central tie-rod 17 a force which exceeds the prestress, the cylindrical body 1 and the lower plug 3 move slightly away from each other, thereby causing a liquid leakage, the separation never occuring at the level of the connection between plug 2 and body 1.

I claim:

1. An oleopneumatic accumulator having a first chamber adapted to receive a pressurized gas, and a second chamber adapted to receive pressurized hydraulic fluid and a flexible membrane therebetween, comprising:

- a cylindrical shell having first and second open ends the inner boring of said shell having a larger section at its second end then its first end;
- a first plug disposed in said cylindrical shell first open end, a peripheral edge of said membrane being disposed therebetween;
- a second plug disposed in said cylindrical shell second open end; and
- at least one pretensioned tierod having a tension corresponding to a predetermined hydraulic fluid pressure and having first and second ends, one of said ends being coupled to one of said plugs and the other of said ends being threaded to receive a nut for couplig to said remaining plug, whereby said cylindrical shell will separate from said second plug when said predetermined pressure is exceeded bringing about a decrease in hydraulic pressure and returning said pressure to a value less then said predetermined pressure.

2. An oleopneumatic accumulator according to claim 1 wherein said tierod is centrally located, said plugs, said cylindrical body and said membrane being maintained pressed against one another between the head of said tierod, bearing against said second plug and a nut screwed onto the second end of said centrally located tierod bearing against said plug, said cylindrical body having been compressed.

3. An accumulator according to claim 2 wherein at least one of the ends of said cylindrical central body comprises a conical surface bearing against a corresponding conical surface provided on said plug.

4. An accumulator according to claim 1, wherein at least one of the ends of the cylindrical central body (1) comprises a conical surface (1*a*) bearing against a corresponding conical surface (3*a*) provided on plug (3).

5. An accumulator according to claim 1, wherein the two upper and lower ends of the cylindrical central body comprise a conical surface bearing on a corresponding conical surface (2*a*, 3*a*) provided on each of the plugs.

6. An oleopneumatic accumulator having a first chamber adapted to receive pressurized gas, and a second chamber adapted to receive a pressurized hydraulic fluid and a flexible membrane disposed between said first and second chambers, said accumulator comprising:

- a cylindrical shell having first and second open ends, the inner boring of said shell having a larger section of its second end than its first end;
- a first plug disposed in said cylindrical shell first open end, a peripheral edge of said membrane being disposed between said first plug and said first open end;
- a second plug disposed in said cylindrical shell second open end; and
- at least one elastic tierod having first and second ends, one of said ends being coupled to one of said plugs and the other of said ends being threaded to receive a nut for coupling to said remaining plug, said tierod being set under a tension prior to coupling to said plugs, said tension corresponding to a predetermined hydraulic fluid pressure;
- whereby said cylindrical shell will separate from said second plug when said predetermined pressure is exceeded, bringing about a decrease in hydraulic pressure and returning said pressue to a value less than said predetermined pressure.

7. An accumulator according to claims 1, 2, 3, 4, 5, and 6, wherein the walls of the separating membrane are applied at the top portion of the accumulator against the inner wall of the central body so that at the junction between the central body and the upper plug, the inner diameter of the accumulator is less than the inner diameter at the junction between the central body and the lower plug by a value corresponding to the membrane thickness, so that when there is an overpressure, a leakage of the liquid occurs between the central body (1) and the lower plug and never between the central body and the upper plug.

8. An accumulator according to claims 1, 2, 3, 4, 5 and 6, wherein the inner boring of the cylindrical body has a section larger at its base than at its top portion.

9. An accumulator according to claim 8 wherein the inner boring of the cylindrical body (1) comprises at its base a chamfer (1*a*), the junction between said cylindrical body (1) and plug (3) being obtained by a skirt (3*b*)

of said plug having the same thickness as the chamfered base of the cylindrical body.

10. An accumulator according to claims 1 or 2, wherein the membrane (4) is fixed by means of a resilient washer (40) formed in its center with a hole the outer peripheral edge (40*b*) of which squeezes the outer edge (4*b*) of the membrane in the corner defined by the junction between the upper plug (2) and the top of the cylindrical body and the edge (40*a*) of the inner hole locks the top of sleeve (21) of membrane (4) inside a groove (33) provided in the tie-rod (17).

11. An accumulator according to claims 1 or 2, wherein the liquid outlet ports (26) are arranged on the plug (3) crown-wise about the central tie-rod (17), the annular bottom (4*a*) of membrane (4) being provided, in register with the ports (26), with pellets (28, 36).

12. An accumulator according to claim 7, wherein the annular bottom (4*a*) of membrane (4) bears against a circular plate (34) supported by a spring (35).

13. An accumulator according to claims 1 or 2, wherein the membrane (4) is provided with a central sleeve (21) threaded onto the central tie-rod (17), said sleeve extending over the whole height of the inner volume of the accumulator and being anchored at its upper end on the upper plug (2).

14. The accumulator according to claims 1 or 2 in which a lower end of said cylindrical shell includes a conical surface bearing against a mating conical surface on an internal face of said lower plug so as to insure a proper centering of said shell and to maintain the centering when said mating control surfaces are slightly separated as a result of a hydraulic pressure exceeding said predetermined maximum value.

15. The hydraulic accumulator according to claim 1 wherein said second plug directly contacts said shell second open end forming a seal therebetween.

* * * * *

UNITED STATES PATENT AND TRADEMARK OFFICE

CERTIFICATE OF CORRECTION

PATENT NO. : 4,449,552

DATED : May 22, 1984

INVENTOR(S) : Louis C. Porel

It is certified that error appears in the above-identified patent and that said Letters Patent are hereby corrected as shown below:

Page 1, after "[21] Appl. No.:" delete "457,702" and insert therefor --347,702--

Signed and Sealed this

*Twenty-third* Day of *October 1984*

[SEAL]

*Attest:*

GERALD J. MOSSINGHOFF

*Attesting Officer*

*Commissioner of Patents and Trademarks*